(12) United States Patent
Hartmann et al.

(10) Patent No.: US 7,462,009 B2
(45) Date of Patent: Dec. 9, 2008

(54) HAND-TRUCK APPARATUS HAVING LOCKING HANDLE

(75) Inventors: Fred O. Hartmann, Thief River Falls, MN (US); Allen C. Aaseby, Thief River Falls, MN (US)

(73) Assignee: Grand Steer Inc., Thief River Falls, MN (US)

( * ) Notice: Subject to any disclaimer, the term of this patent is extended or adjusted under 35 U.S.C. 154(b) by 100 days.

(21) Appl. No.: 10/612,816

(22) Filed: Jul. 2, 2003

(65) Prior Publication Data

US 2005/0002766 A1    Jan. 6, 2005

(51) Int. Cl.
- B60P 1/00    (2006.01)
- B62B 1/00    (2006.01)
- B62B 3/00    (2006.01)
- B62B 5/00    (2006.01)

(52) U.S. Cl. ............... 414/434; 280/79.11; 280/651; 280/47.371; 280/655.1; 414/467

(58) Field of Classification Search ............ 414/467, 414/434; 280/47.11, 651, 655.1, 47.34, 87.05, 280/30, 47.371; 298/2; 190/115; 180/19.1; 16/18 CG, 900, 429; 188/19; 108/55.1; 211/195, 198; 292/24
See application file for complete search history.

(56) References Cited

U.S. PATENT DOCUMENTS

| | | | | |
|---|---|---|---|---|
| 1,582,045 A * | 4/1926 | Don Howe | ............... | 280/655.1 |
| 2,469,242 A * | 5/1949 | Pohl | ............ | 280/651 |
| 2,483,241 A * | 9/1949 | Shepherd | ............ | 16/18 CG |
| 2,659,100 A * | 11/1953 | Cramer | ............ | 16/22 |
| 2,706,643 A | 4/1955 | Babcock | | |
| 2,725,946 A * | 12/1955 | Welter | ............ | 180/19.1 |
| 2,783,905 A | 5/1957 | Marcusson | | |
| 3,236,539 A * | 2/1966 | Ketterer | ............ | 280/87.01 |
| 3,269,741 A * | 8/1966 | Porcello | ............ | 280/5.26 |
| 3,488,062 A * | 1/1970 | Walda | ............ | 280/43 |
| 3,499,398 A * | 3/1970 | Murray | ............ | 108/53.5 |
| 3,658,383 A * | 4/1972 | Sisson | ............ | 298/2 |
| 3,762,739 A * | 10/1973 | Tabet | ............ | 280/47.371 |
| 4,137,984 A | 2/1979 | Jennings et al. | | |
| 4,186,841 A * | 2/1980 | Buckley et al. | ............ | 220/6 |
| 4,203,609 A | 5/1980 | Mitchell et al. | | |
| 4,209,183 A * | 6/1980 | Jones et al. | ............ | 280/79.3 |
| 4,655,466 A * | 4/1987 | Hanaoka | ............ | 280/47.371 |
| 4,811,988 A * | 3/1989 | Immel | ............ | 298/2 |
| 4,887,836 A * | 12/1989 | Simjian | ............ | 280/651 |
| 5,078,415 A * | 1/1992 | Goral | ............ | 280/79.2 |
| 5,484,046 A * | 1/1996 | Alper et al. | ............ | 190/115 |
| 5,538,386 A * | 7/1996 | Scheibel | ............ | 414/467 |
| 5,857,695 A | 1/1999 | Crowell | | |

(Continued)

FOREIGN PATENT DOCUMENTS

FR    2604139 A1 *    3/1988

*Primary Examiner*—Gregory W Adams
(74) *Attorney, Agent, or Firm*—DuFault Law Firm, P.C.; Dustin R. DuFault (57) ABSTRACT

A hand-truck for supporting and transporting the load placed thereon includes a stowable handle. The stowable handle is positionable between a stowed position, a locked position and an infinite number of positions therebetween. The handle is accessible by a user at each position. The hand-truck can transport a load by hand and is accessible to be lifted by a forklift from any side.

13 Claims, 6 Drawing Sheets

U.S. PATENT DOCUMENTS

| | | | |
|---|---|---|---|
| 5,899,482 A * | 5/1999 | Kimura | 280/445 |
| 6,095,533 A * | 8/2000 | Balolia | 280/35 |
| 6,199,878 B1 * | 3/2001 | Masserant et al. | 280/33.994 |
| 6,474,665 B1 * | 11/2002 | Fink et al. | 280/79.2 |
| 6,508,479 B1 * | 1/2003 | Tseng | 280/47.34 |
| 6,536,796 B1 * | 3/2003 | Solomon | 280/651 |
| 6,575,274 B1 * | 6/2003 | Huang | 190/115 |
| 6,701,570 B2 * | 3/2004 | Henriott et al. | 16/29 |
| 2003/0085552 A1 * | 5/2003 | Shapiro | 280/646 |
| 2003/0234517 A1 * | 12/2003 | Sagol | 280/655.1 |
| 2004/0080128 A1 * | 4/2004 | Lindsey et al. | 280/30 |

* cited by examiner

HAND-TRUCK APPARATUS HAVING LOCKING HANDLE

CROSS-REFERENCE TO RELATED APPLICATION(S)

None.

BACKGROUND OF THE INVENTION

The present invention generally relates to material handling devices. More particularly, the present invention relates to a hand-truck for transporting objects placed thereon.

Hand-trucks have been widely used in the art of material handling as devices to transport items too difficult to be carried by hand, or by several persons, including appliances, loads stacked upon a pallet, containers containing heavy materials or boxes packed for shipping. Hand-trucks are also generally used to transport loads relatively short distances or in places or spaces where mechanized trucks or forklifts are incapable or unable to operate.

In environments where there are numerous activities which require the use of hand-trucks, such as in warehouses, shipping centers or manufacturing plants, the use of hand-trucks is vital to the smooth operation of the particular endeavor. However, in many instances hand-trucks have shortcomings which either prohibit or reduce the efficiency at which to perform the operation.

One such example is the storage of the hand-truck when not in use, especially when there are several hand-trucks contained within a specific area. Hand-trucks tend to be bulky, and in so doing take up space when not in use. This can be problematic in instances where the particular environment has either limited floor space or the number of hand-trucks used for any particular application makes available floor space an issue. Even the storage of a single hand truck can be problematic if space is extremely limited.

As mentioned, hand-trucks are often times used to transport pallets of materials placed thereon. These pallets are typically placed upon the hand-truck by a mechanized forklift, with the hand-truck then being moved to another area of the facility, where it is either unloaded by hand or by another forklift. Inherently, this requires the use of a pallet, and pallets themselves can be quite bulky and require storage space. Pallets are also typically manufactured from wood, and are subject to frequent stresses throughout their lifetime, which tends to damage them quite quickly. This leads to the expense of purchasing additional pallets to replace destroyed pallets, repairing damaged pallets and disposal of destroyed pallets.

Another problem with hand-trucks of the prior art is in the design of the handle which is used to tote or direct the hand-truck. There are known in the art several handle designs, including retractable handles, detachable handles, fixed handles and stowable handles. Each handle is designed with a particular application in mind. However, there does not exist a handle that can aptly be applied to several applications and yet still retain its effectiveness for directing the hand-truck in each situation.

Another problem of hand-trucks of the prior art is the difficulty in loading or unloading the hand-truck. In some situations, the hand-truck is loaded or unloaded by hand. Whether there be one object or a plurality of objects to load or unload, the loading or unloading may be difficult due to the fact that the hand-truck is on wheels, and any type of force used by a person to place or remove an item from the hand-truck causes the hand-truck to move, especially on smooth surfaces such as concrete. This is problematic because the worker may lose grip on the item, or the item may slip from the hand-truck, causing either damage to the item, the worker or both.

The present invention overcomes these shortcomings by providing a hand-truck that can be easily stored, provides a handle that can be used in multiple applications, can itself be moved either manually or by forklift to obviate the need for pallets, and can easily be anchored to the ground to prevent movement of the hand-truck.

BRIEF SUMMARY OF THE INVENTION

The present invention includes a hand-truck for transporting materials placed thereon. The hand-truck comprises a platform supported by a set of fixed wheels on a first side and a set of caster wheels on an opposing second side. The hand-truck further comprises a handle that is positionable between a stowed position, a pivotal position and a locked position. The handle is locked into the locked position by a locking mechanism to provide a means to manually direct or push the hand-truck. The hand-truck further comprises an undercarriage for accepting fingers of a forklift to lift the hand-truck in the same manner as a wooden pallet. A foot-brake connected to the undercarriage anchors the hand-truck to the ground when loading or unloading the hand-truck. When not in use, the handle can be stowed within the undercarriage and used to lift the hand-truck to a vertical position for storage. While in the vertical position, the hand-truck is substantially supported by guards disposed about each fixed wheel.

DETAILED DESCRIPTION

Figure 1:
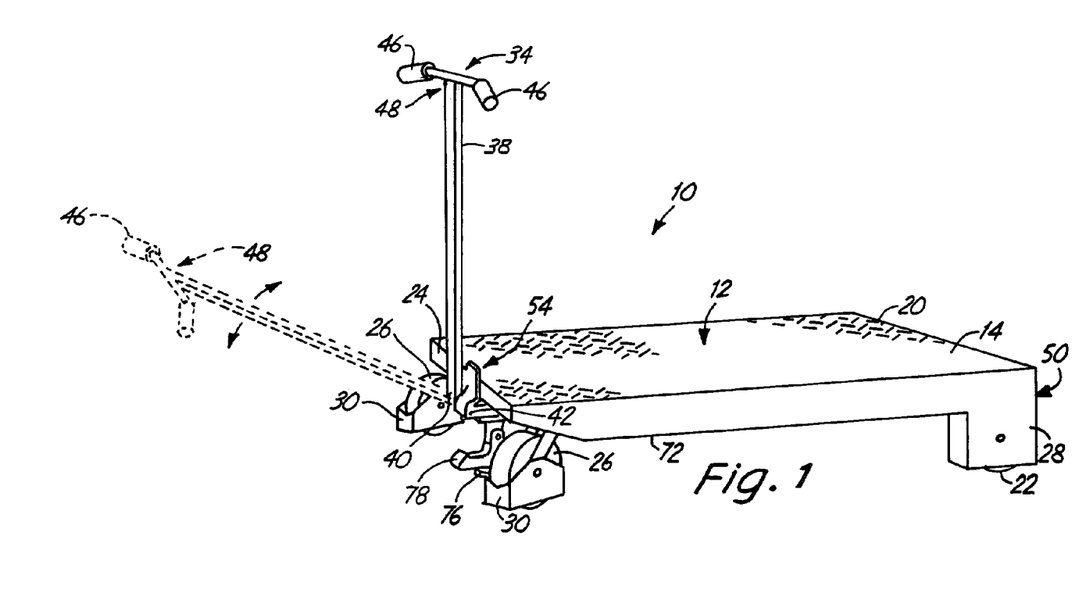
FIG. 1 is a perspective view of a hand-truck of the present invention including a handle in a locked position (solid) and in a pivotable position (dashed).
Figure 2:
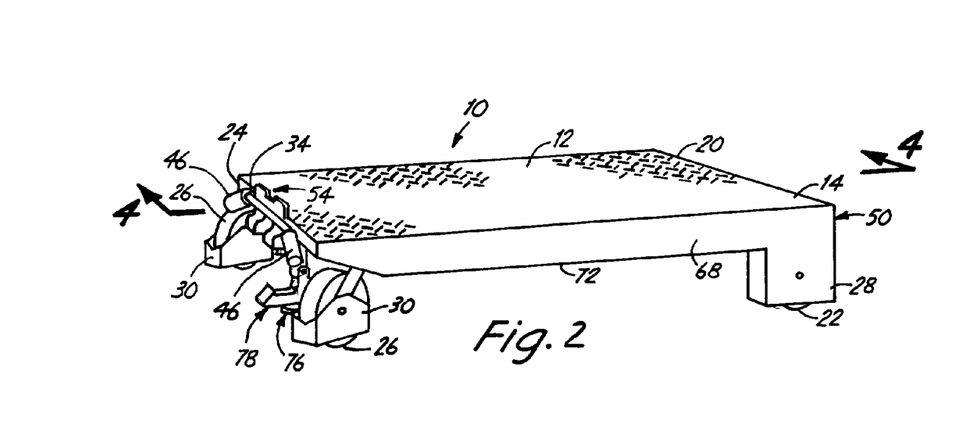
FIG. 2 is a perspective view of the hand-truck of the present invention with the handle in a stowed position.

A hand-truck of the present invention is generally indicated at 10 in FIGS. 1 and 2. The hand-truck 10 is useful for transporting objects or items placed thereon. Such objects or items include, but are not limited to, boxes, containers, barrels, reams and pallets either by themselves or containing the same objects placed thereon. In a preferred embodiment, the hand-truck 10 comprises a square platform 12 having a flat top surface 14 for supporting the objects. It should be noted, however, that other configurations of the platform 12 are well within the scope of the present invention including, but not limited to, any polyhedral configuration or circular configuration. Alternatively, the platform 12 may also include an upwardly extending side member or members, depending on the specific use of the hand-truck 10. The platform 12 is preferably constructed of steel having a raised cross-hatch pattern to reduce slipping of the objects during transport, loading or unloading. However, the platform 12 may also include any other suitable material of construction or have any pattern contained thereon, dependent upon the particular need and target cost of the hand-truck 10.

Supporting the hand-truck 10 while in a horizontal position are ground engageable wheels positioned at each corner along an underside 18 of the platform 12. Preferably, a first side 20 of the hand-truck 10 includes fixed directional wheels 22 while an opposing second side 24 of the hand-truck 10 includes caster wheels 26. The caster wheels 26 allow the hand-truck 10 to be more easily guided, or steered, as is known in the art. However, it should be noted that it is also within the scope of the present invention to include fixed directional wheels positioned at each corner, caster wheels positioned at each corner, or any combination thereof, including wheels positioned anywhere along the underside 18 of the platform 12 to provide adequate support to the hand-truck 10.

Wheel guards 28 fixedly attach to an underside 18 of the platform 12 at opposing corners. The wheel guards 28 preferably have a four sided, rectangular configuration. Disposed within each wheel guard 18 are the respective fixed-directional wheels 22. Preferably, each fixed-directional wheel 22 is attached to the respective guard 28 and thus connected to the platform 12. However, it is also within the scope of the present invention to attach the fixed-directional wheels 22 directly to the platform 12 and provide the guards 28 either attached to the platform 12 or to the wheels 22. Each guard 28 downwardly extends from the platform 12 a selected distance to allow each fixed-directional wheel 22 to protrude slightly from the guard 28, allowing each fixed-directional wheel 22 to engage the ground while the platform 12, and subsequently the hand-truck 10, is in a substantially horizontal position. The guards 28 prevent objects, such as human appendages, debris or miscellaneous items sporadically located on floors, from coming into contact with the wheels 22. The guards 28 also provide a means of support when positioning the hand-truck 10 in a stored position, as will be discussed.

Attached to the underside 18 of the platform 12 at opposing corners of the second side 24 are the caster wheels 26. Each caster wheel 26 also includes a guard 30. Preferably, the guards 30 attached to the caster wheels 26 are not directly attached to the platform 12 to allow the caster wheels 26 to freely rotate and provide greater steering ability to the hand-truck 10. While it is preferable to position the caster wheels 26 at the opposing corners to provide the greatest stability to the hand-truck 10, it is also within the scope of the present invention to provide the caster wheels 26 at any position along the second side 24 of the hand-truck 10, or any other position along the underside 18 of the platform 12. It is also within the scope of the present invention to provide only a single wheel, such as at the center of the second side 24 of the hand-truck 10.

Figure 4:
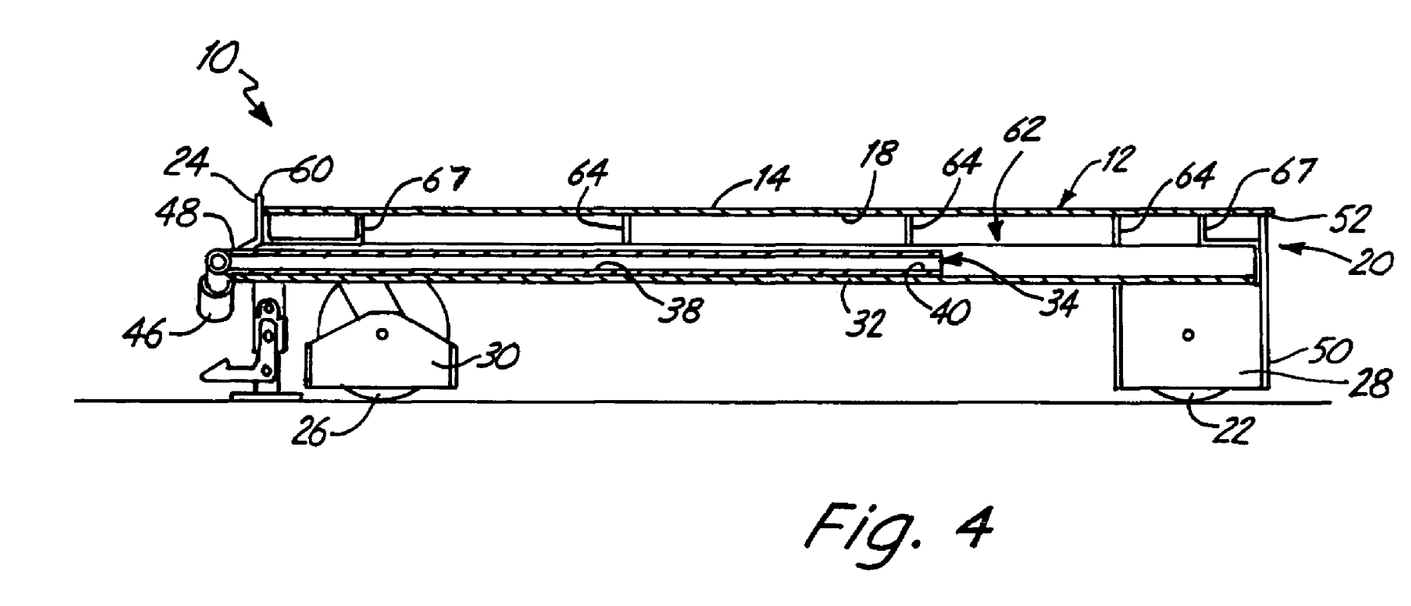
FIG. 4 is a cross-sectional view of the hand-truck of the present invention taken along lines 4-4 in FIG. 2.

Disposed centrally along the underside 18 of the platform 12 between the first side 20 and the second side 24 is a channel member 32. The channel member 32 provides rigid support to the platform 12 along with a means to house and connect a handle 34 to the hand-truck 10. The channel member 32 includes a hinge portion 36 extending slightly past the second side 24 of the hand-truck 10 for pivotal engagement with the handle 34. The handle 34 includes an elongated portion 38 having a distal end 40 disposable within the channel member 32. The elongated portion 38 disposes between hinge members 42 of the hinged portion 36 of the channel member 32. The distal portion 40 of the handle 34 further includes cylindrical members 44 to engage the respective hinge members 42. The cylindrical members 44 and the hinge members 42 are formed such that both translational and pivotal movement of the handle 34 with respect to the hinge portion 36 are permitted to both adjust the position of the handle 34 and to lock the handle 34 to the platform 12. While it is preferable that the hinge portion 36 and the channel member 32 are integrally formed, it is well within the scope of the present invention to provide the hinge portion 36 separate from the channel member 32 wherein the hinged portion 36 attaches to channel the member 32, the platform 12 or any other portion of the hand-truck 10.

The handle 34 also includes handlebars 46 positioned at a proximal end 48. The handlebars 46 provide a means for the user to firmly grip the handle 34 whereby the hand-truck 10 may be steered, pulled or pushed. Through use of the handlebars 46, the handle 34 is positionable between several positions. To stow the handle 34 within the channel member 32, the handle 34 is positioned to be substantially parallel with the platform 12 and then urged into the channel member 32. As mentioned, the elongated portion 38 disposes between the hinge members 42, and upon urging the handle 34 within the channel member 32, the handle 34 slidably engages the channel member 32. The handle 34 is disposed within the channel member 32 until the handlebars 46 engage the hinge portion 36, whereby the handle 34 is fully stowed within the channel member 32. At this position, however, the handlebars 46 are still accessible by the user, and can be used to lift or lower the hand-truck 10 into or from the substantially vertical storage position.

Figure 3:
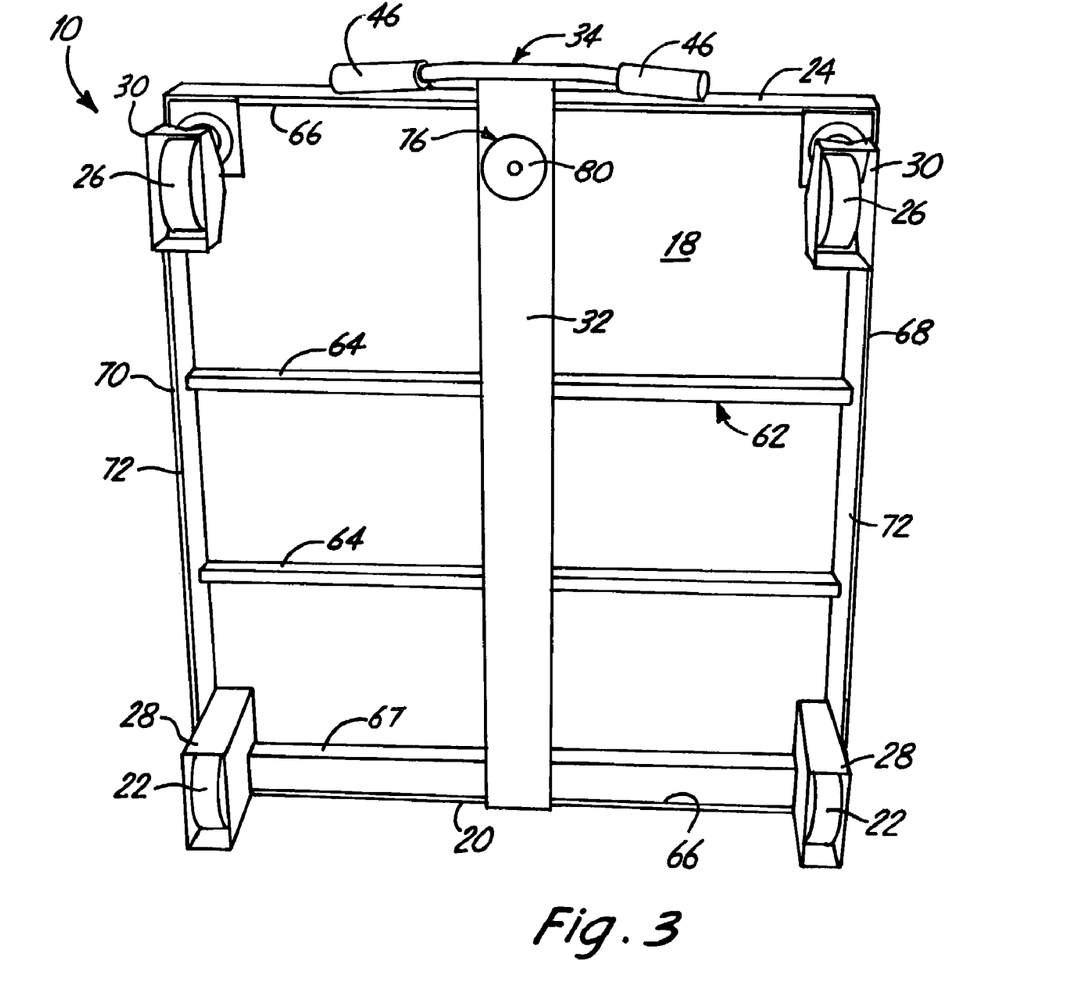
FIG. 3 is a perspective view of the hand-truck of the present invention in a vertical storage position.

While in the vertical storage position, the hand-truck 10 takes up less floor area and can be set aside when not in use. To position the hand-truck 10 into the vertical position, the second end 24 of the hand-truck 10 is raised. Upon doing so, the guards 28 attached to the first end 20 of the platform 12 engage the ground. Further raising of the second end 24 disengages the fixed-directional wheels 22 from the ground, and the hand-truck 10 is positionable such that a surface 50 of the guards 28 and a side surface 52 of the platform 12 engage the ground, thereby supporting the hand-truck 10 in the stored position. Because the guards 28 are constructed to be slightly raised off of the ground while the hand-truck 10 is in the horizontal position, the second side 24 of the hand-truck 10 needs only be raised slightly to engage the guards 28 with the ground, which reduces the chances of the hand-truck 10 slipping away while raising or lowering the hand-truck 10, which reduces chances of injury to the user or damage to the hand-truck 10.

Positioning the hand-truck 10 in the horizontal position once again, the user can retrieve the handle 34 by grabbing the handle-bars 46 and pulling the handle 34 from the channel member 32. Upon pulling the handle 34 such that the cylindrical members 44 engage the hinge members 42 of the hinge portion 36, the handle 34 can be pivotally positioned from a lowered position to a raised position, and an infinite number of positions therebetween. While between the raised and lowered positions, the handle 34 is best suited for pulling the hand-truck 10 when the hand-truck 10 is in the horizontal position. However, it may desirable to use the handle 34 to push the hand-truck 10, or alternatively to secure the handle 34 if use of the handle 34 is momentarily not needed but the user does not want to go through the procedure of stowing the handle 34 within the channel member 32. In either circumstance, the handle 34 can be rigidly locked to the hand-truck 10 while in a substantially vertical position. By substantially vertical it is meant that the handle 34 is for the most part vertical, but slight variation in either direction, up to about 15 degrees from vertical, is well within the scope of the present invention. It should be noted, however, that while the elongated portion 38 of the handle is preferably linear, it is also within the scope of the present invention to provide a non-linear elongated portion 38, which would invariably affect the verticality of the handle 34 while locked to the hand-truck 10.

Figure 5:
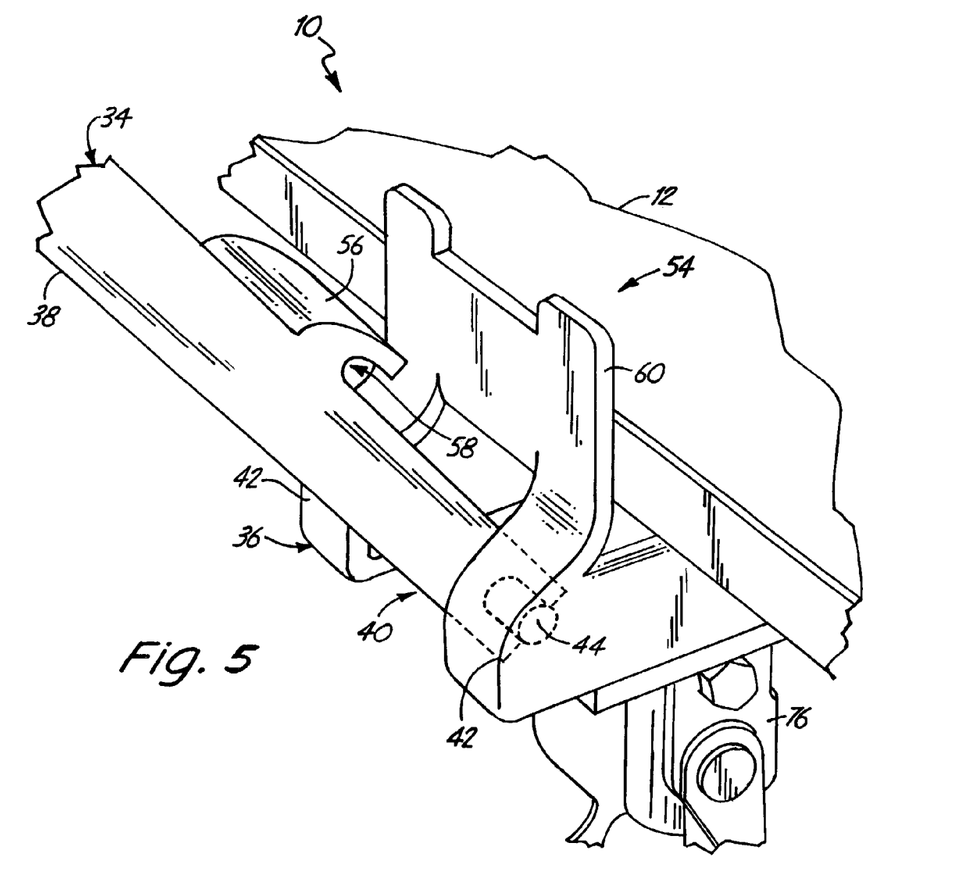
FIG. 5 is a perspective view of a locking mechanism of the present invention while the handle is in the pivotable position.
Figure 6:
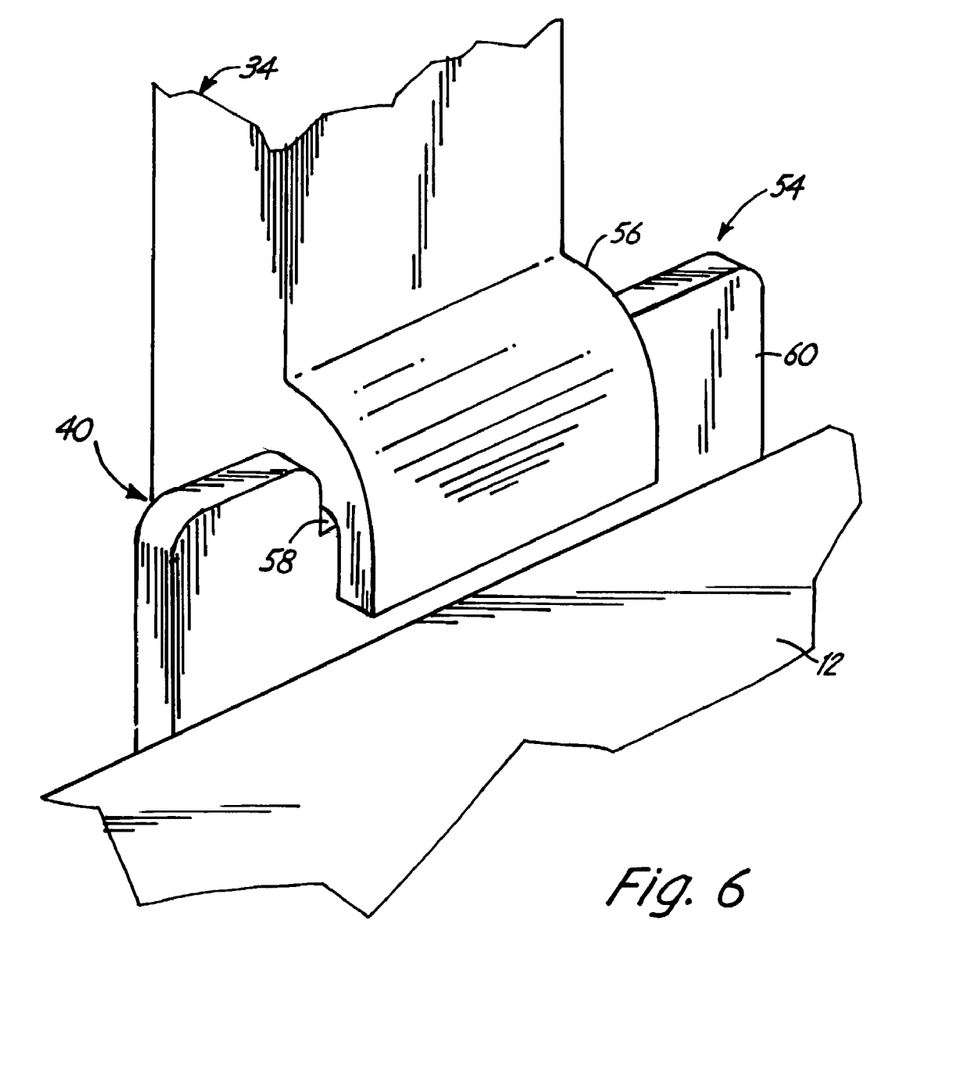
FIG. 6 is a partial perspective view of the locking mechanism of the present invention with the handle in the locked position.

In the preferred embodiment, the handle 34 is locked to the hand-truck 10 by a locking mechanism 54. The locking mechanism 54 includes a tongue member 56 attached to the elongated portion 38 of the handle 34 proximate the distal end 40. The tongue member 56 protrudes slightly from the elongated portion 38 and extends toward the distal end 40 such that a gap 58 exists between the tongue member 56 and the elongated portion 38 of the handle 34. The locking mechanism 54 further includes a locking plate 60 attached to the platform 12.

To lock the handle 34 to the hand-truck 10, the handle 34 is positioned toward the raised position. As mentioned, the hinge portion 36 is constructed to allow both pivotal and translational movement of the handle 34. While in the raised position, the handle is positioned vertical to position the tongue member 56 to cooperably engage with the locking plate 60. Upon positioning the handle 34 to cooperably engage the tongue member 56 with the locking plate 60, the handle is positioned downward and the locking plate 60 disposes between the tongue member 56 and the elongated portion 38 of the handle 34, which rigidly locks the handle 34 to the hand-truck 10. Preferably, the locking plate 60 attaches to the platform 12 and extends slightly upward. However, it is also within the scope of the present invention to provide an aperture (not shown) in the platform 12 proximate the handle 34 for insertion of the tongue member 56 to lock the handle 34 to the platform 12. To unlock the handle 34, the handle is positioned to disengage the tongue 56 from the locking plate 60 by raising the handle 34, which allows the handle 34 to be repositioned to pivotally engage the hinged portion 36. The handle 34 may then be used to pull the hand-truck 10, or stowed into the channel member 32 as described.

The hand-truck 10 of the present invention further comprises an undercarriage 62 for receiving fingers of a forklift which are known in the art of material handling. The undercarriage 62 is constructed to accept the fingers of the forklift from any side of the hand-truck, regardless of the position of the handle 34. To accept the fingers from the first side 20 or the second side 24, the undercarriage 62 includes cross braces 64 disposed transverse to the channel member 32. Each cross brace 62 has a height that equals or is greater than either a forward or rearward lip 66 of the platform 12, which would be positioned along the first side 20 or second side 24, respectively, of the platform 12. The undercarriage 62 further includes support members 67 attached to the first side 20 and the second side 24 of the platform 12, with each support member 67 having substantially the same height as the cross braces 64. To lift the hand-truck from either the first side 20 or the second side 24, the forklift is positioned such that each finger is placed under the hand-truck 10. Upon lifting the fingers, the fingers engage the cross braces 64, along with the respective lip 66 and support member 67, and the hand-truck 10 is lifted where it can be transported in the same fashion as a pallet to a desired location.

To accept fingers of a third side 68 or an opposing fourth side 70, the undercarriage 62 includes the channel member 32 along with support members 72 positioned along the third side 68 and fourth side 70 of the platform 12. Preferably, the support members 72 are integrally formed with the platform 12. Alternatively, each support member 72 may include separate members attached to the platform. Each support member 72, while either integrally formed or attached to the platform, includes a portion 74 that extends from the platform 12 a distance approximately equal to the distance that the channel member 32 extends from the platform 12. Thus, when the fingers of the forklift are inserted under the hand-truck 10 from either the third side 68 or the fourth side 70, the fingers engage the channel member 32 and at least the respective side member 72, enabling the fingers to lift the hand-truck 10 and transport it similar to a wooden pallet.

Figure 7:
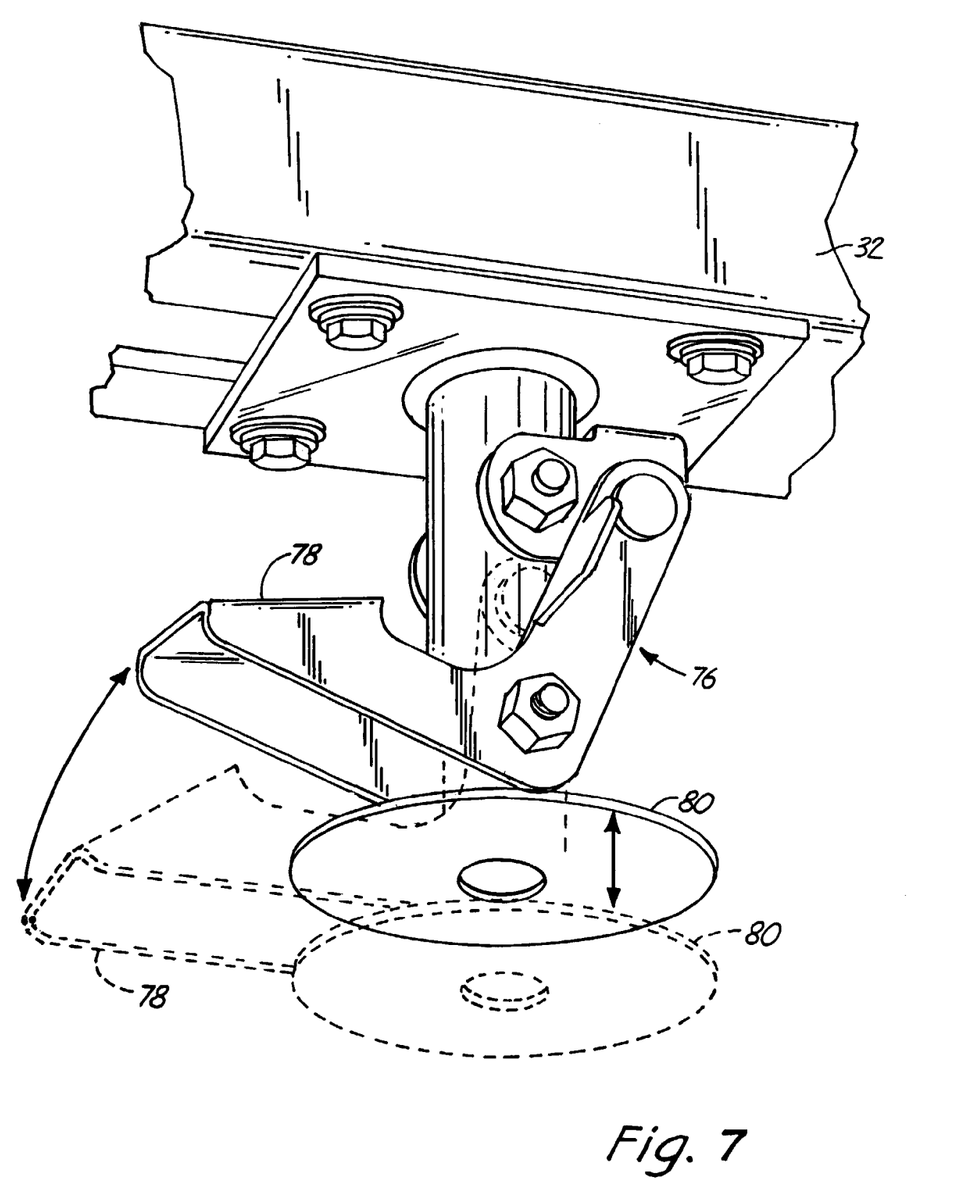
FIG. 7 is a partial perspective view of a foot-brake of the present invention.

The hand-truck 10 further comprises a foot-brake 76 for anchoring the hand-truck 10 to the ground to prevent unwanted movement or accidental roll away of the hand-truck 10 while loading or unloading the hand-truck 10. Preferably, the foot-brake 76 attaches to the channel member 32 and extends toward the ground while the hand-truck 10 is in the horizontal position. It should be noted, however, that the foot-brake 76 can be attached directly to the platform 12 or at any other location where it can be used for its intended purpose of anchoring the hand-truck 10 to the floor. To activate the foot-brake 76, a lever 78 is pressed by the foot which engages a pad 80 with the ground and the hand-truck 10 is frictionally engaged to the ground. To release the foot-brake 76, the lever 78 is depressed, which retracts the pad 80 from the ground, thereby engaging the caster wheels 26 with the ground and allowing the hand-truck 10 to be steered or directed with the handle 34.

Although the present invention has been described with reference to preferred embodiments, workers skilled in the art will recognize that changes may be made in form and detail without departing from the spirit and scope of the invention.

The invention claimed is:

1. A hand-truck comprising:
   a platform;
   ground engageable wheels connected to the platform;
   a channel member fixedly attached to an underside of the platform;
   a locking plate connected to the platform proximate to the channel member;
   first and second spaced-apart hinge members fixedly attached to the channel member;
   a handle connectable to the platform comprising:
      a unitary rigid member slidably disposable within the channel member and between the first and the second spaced-apart hinge members;
      a tongue portion spaced-apart from and extending parallel to the rigid member; and
      a stop positioned proximate to a distal end of the rigid member; and
   whereupon extracting the handle from the channel member, the stop engages the first and second hinge members and the handle is pivotally positionable between a lowered positioned and a raised position, wherein the handle is lockable to the platform by positioning the handle to dispose the locking plate between the tongue portion and the rigid member; wherein said hinge members define an axis about which said stop pivots wherein said axis is horizontally offset from a platform edge such that said handle pivots to vertical in said locked and raised position.

2. The hand-truck of claim 1 and further comprising a foot-brake attached to the platform, whereupon enacting the foot-brake, the foot-brake engages the ground thereby preventing movement of the hand-truck.

3. The hand-truck of claim 1, and further comprising:
   first and second guard members attached to the underside of the platform; and
   a wheel disposed within each guard member, wherein the wheels engage the ground when the platform is in a substantially horizontal position, whereupon raising a second end of the platform the guard engages the ground, whereupon further raising of the second end disengages the wheels from the ground and the hand-truck is positionable to a substantially vertical position supported by the guard members.

4. The hand-truck of the claim 1 wherein the handle further comprises handlebars that are accessible to operatively maneuver the hand-truck regardless the position of the handle.

5. The hand-truck of claim 1, and further comprising support members extending downwardly from the platform and positioned substantially parallel to the channel member, wherein portions of the support members and the channel member extend equidistantly downward from the platform.

6. The hand-truck of claim 5 wherein the support members and the channel member are positioned to receive a forklift finger between the channel member and either support member or transversal to the channel member and the support members.

7. The hand-truck of claim 1 wherein the tongue portion fixedly attaches to an outer longitudinal surface of the rigid member.

8. A hand-truck for supporting and transporting a load placed thereon, the hand-truck comprising:
   a platform;
   ground engageable wheels connected to the platform;
   a unitary rigid handle connected to the platform, the handle positionable between a slidable position, a pivotal position and an extended locked position, the handle substantially perpendicular and fixedly securable to the platform while in the extended locked position to prevent pivotal movement of the handle;
   a channel member fixedly attached to an underside of the platform for receiving the handle, wherein the handle slidably disposes within the channel member while in the slidable position;
   first and second spaced-apart hinge members positioned beyond an edge and fixedly connected to the platform, the handle slidably disposable between the hinge members;
   first and second stop members attached proximate to a distal end of the handle;
   a locking plate connected to the platform; and
   a tongue member spaced-apart from the handle, the tongue member engageable with the locking plate, whereupon slidably positioning the handle towards the pivotal position, the first stop member engages the first hinge member and the second stop member engages the second hinge member, the first and second stop members defining an axis about which the handle is pivotal about the first and second hinge member, the axis is horizontally offset from the platform edge, whereby the handle is pivotal to fixedly secure the handle to the platform in the locked position by engaging the tongue member with the locking plate.

9. The hand-truck of claim 8, whereupon positioning the handle from the pivotable position to the slidable position, the first stop member disengages from the first hinge member and the second stop member disengages from the second hinge member.

10. The hand-truck of claim 8, and further comprising support members extending from the platform and positioned substantially parallel to the channel member, wherein portions of the support members and the channel member equidistantly extend from the platform.

11. The hand-truck of claim 8 and further comprising a foot-brake connected to the platform, whereupon activating the foot-brake, the foot-brake extends to frictionally engage the ground, thereby preventing movement of the hand-truck.

12. The hand-truck of claim 8, and further comprising:
   a downwardly extended guard member attached to a first end of the platform; and
   a wheel connected to the underside of the platform proximate the guard member, wherein the wheel engages the ground when the platform is in a substantially horizontal position, whereupon raising a second end of the platform, the second end opposing the first end, the guard member engages the ground, whereupon further raising of the second end of the platform disengages the wheel from the ground to position the hand-truck in a substantially vertical position supported by the guard member.

13. The hand-truck of claim 8 wherein the tongue member fixedly attaches to an outer longitudinal surface of the handle.

* * * * *